(12) United States Patent
Liu et al.

(10) Patent No.: US 11,148,245 B2
(45) Date of Patent: Oct. 19, 2021

(54) MULTI-DEGREE-OF-FREEDOM ERROR MEASUREMENT SYSTEM FOR ROTARY AXES AND METHOD THEREOF

(71) Applicant: NATIONAL CHUNG CHENG UNIVERSITY, Chiayi County (TW)

(72) Inventors: Chien-Sheng Liu, Chiayi County (TW); Yu-Ta Chen, Chiayi County (TW); Yu-Xiang Lin, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 601 days.

(21) Appl. No.: 16/018,436

(22) Filed: Jun. 26, 2018

(65) Prior Publication Data

US 2019/0314947 A1    Oct. 17, 2019

(30) Foreign Application Priority Data

Apr. 13, 2018  (TW) .................................. 107112714

(51) Int. Cl.
  *G02B 5/00* (2006.01)
  *B23Q 17/24* (2006.01)
  *G05B 19/401* (2006.01)

(52) U.S. Cl.
  CPC ....... *B23Q 17/2485* (2013.01); *B23Q 17/249* (2013.01); *B23Q 17/2495* (2013.01); *G05B 19/401* (2013.01)

(58) Field of Classification Search
  CPC .............. B23Q 17/2485; B23Q 17/249; B23Q 17/2495; G05B 19/401
  See application file for complete search history.

(56) References Cited

U.S. PATENT DOCUMENTS

| | | | |
|---|---|---|---|
| 2003/0160968 A1* | 8/2003 | Deck .................. | G01B 9/02057 356/515 |
| 2006/0072119 A1* | 4/2006 | Hill ..................... | G01B 9/02061 356/500 |
| 2006/0146384 A1* | 7/2006 | Schultz .............. | G02B 27/0927 359/9 |

OTHER PUBLICATIONS

Yi-Tsung Li, Wen-Po Sun, and Kuang-Chao Fan, "Measurements of tilt error and eccentric error of rotary stages," 2015, pp. 1-6. (Year: 2015).*

* cited by examiner

*Primary Examiner* — Mohamed Charioui
*Assistant Examiner* — Christine Y Liao
(74) *Attorney, Agent, or Firm* — Rosenberg, Klein & Lee

(57) ABSTRACT

The present invention provides a multi-degree-of-freedom error measurement system for rotary axes and the method thereof. By producing a first ray, a second ray, and a third ray, the multi-facet reflector and the axicon disposed on an axis average line can receive the first, the second, and the third rays, respectively, for producing a reflective ray, a refractive ray, a first emitted ray, and a second emitted ray. Thereby, errors of the axicon in a plurality of degrees of freedom caused by shift or vibration of the axis average line, such as the x-axis radial error, the y-axis radial error, the axial error, the x-axis tilt error, the tilt error for the y-axis, and the angular alignment error for rotation can be measured.

11 Claims, 16 Drawing Sheets

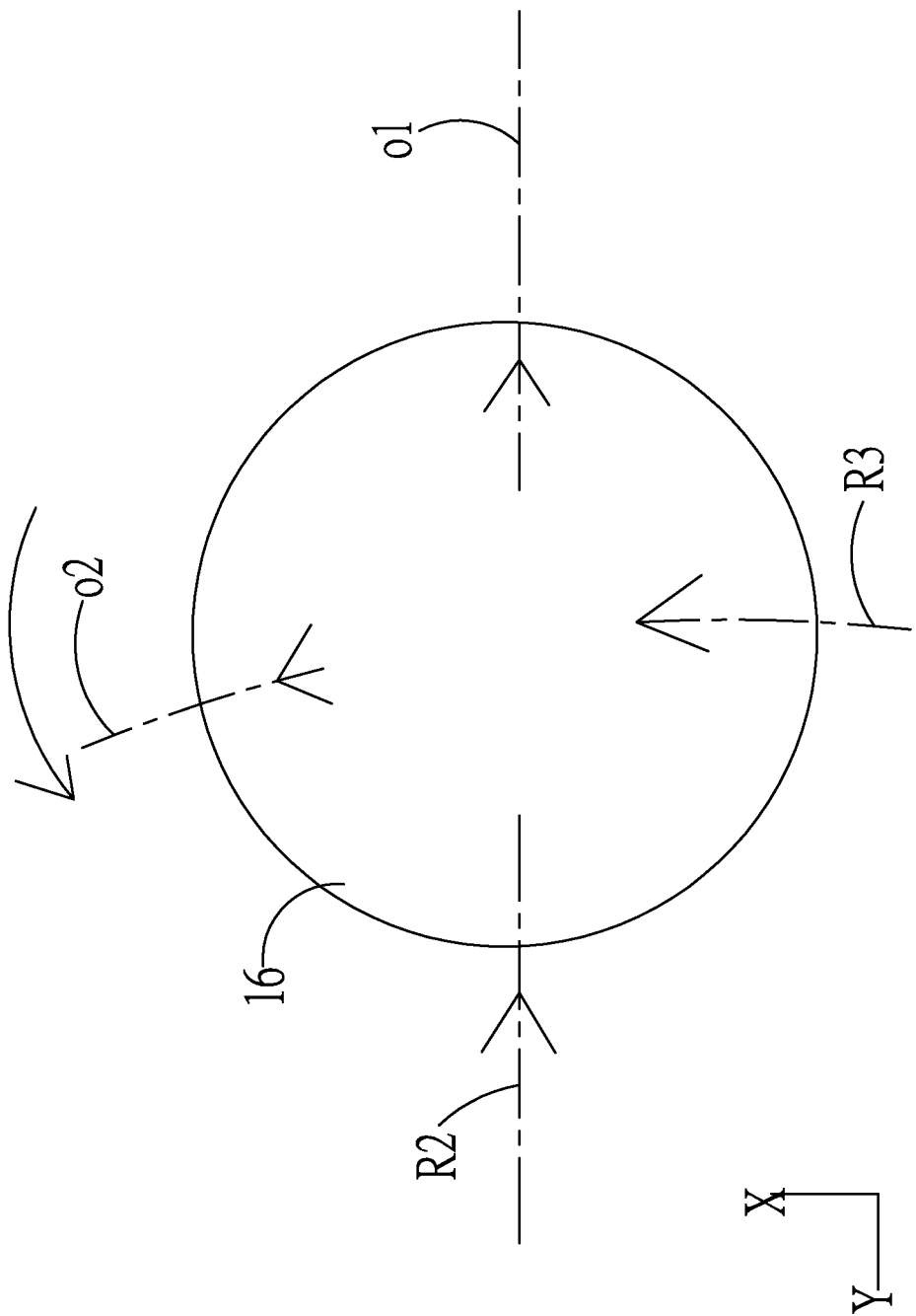

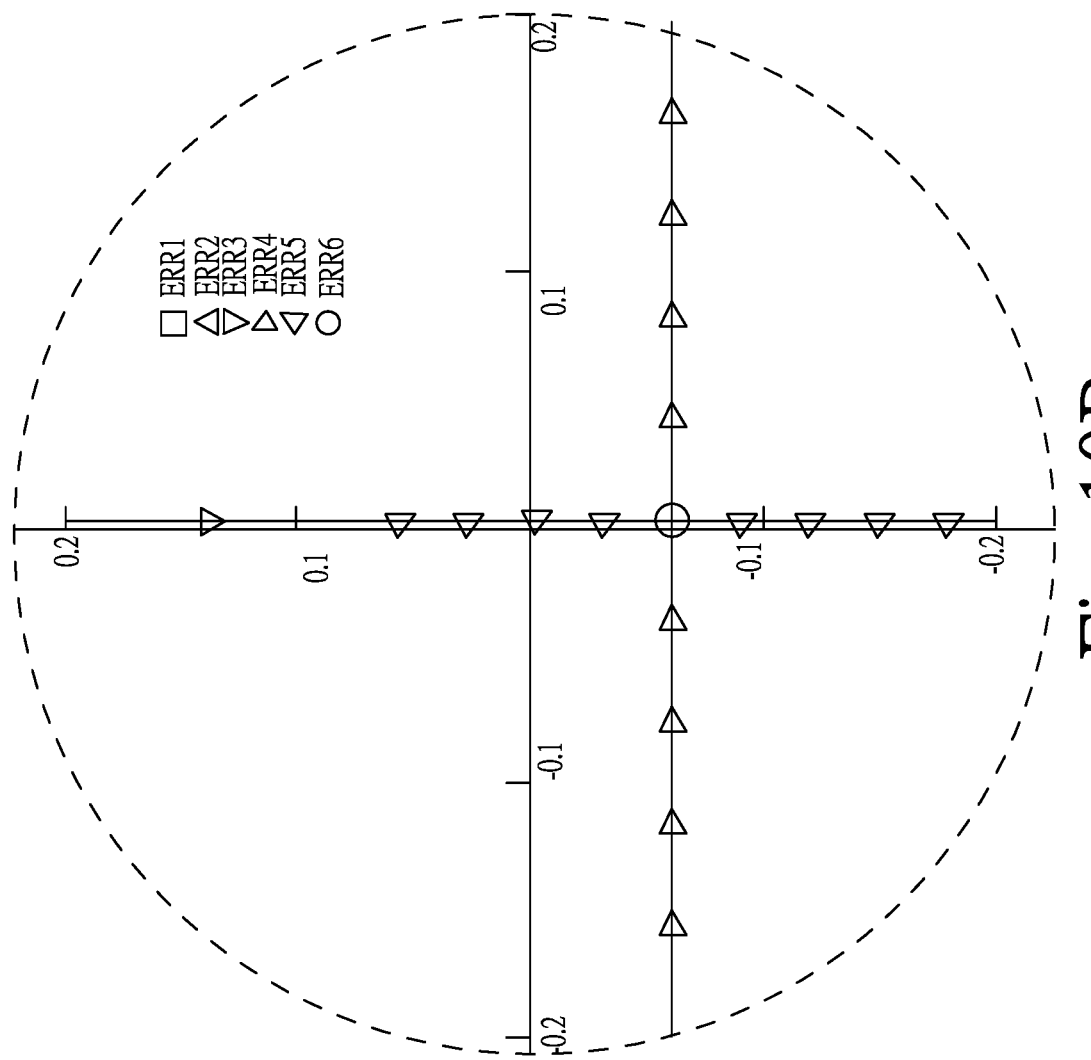

MULTI-DEGREE-OF-FREEDOM ERROR MEASUREMENT SYSTEM FOR ROTARY AXES AND METHOD THEREOF

FIELD OF THE INVENTION

The present invention relates generally to a measurement system and the method thereof, and particularly to a multi-degree-of-freedom error measurement system and the method thereof.

BACKGROUND OF THE INVENTION

As technologies progress in recent years, the requirements for machining efficiency and product quality in the industry is demanding increasingly. Owing to the limitations imposed by mechanism and controller designs as well as manual operations, it is difficult for traditional machine tools to improve machining efficiency and quality, making the satisfaction for the requirements by modern technologies not possible. On the other hand, computer numerical control (CNC) machine tools own precise and rapid manufacturing capability. According to their functions, general machine tools can be categorized into metal cutting machine tools and metal forming machine tools. In particular, metal cutting machine tools process metal workpieces by removing materials using methods such as plastic cutting, discharge etching, or laser. Thereby, new types of machine tools are invented for satisfying the needs of industries.

Currently, Industry 4.0 is aggressively promoted in the country. In addition, machine tools play an indispensable role in the defense, aerospace, and car industries and is a significant foundation for national development of industries. Some countries even regard the output values of machine tools as an index of national competitiveness, making the importance of multi-axis machine tools highly valued. Normal 5-axis machine tools include linear and rotary axes. Presently, the measurement technology for linear axes has been very mature while the one for rotary axes hasn't. It is still not possible for current technologies to achieve multi-degree-of-freedom error measurement currently, particularly for current general measurement instruments. For example, laser interferometers or auto collimators can measure angular alignment errors for rotation but no other errors for rotary axes. Thereby, to improve the precision of machine tools in rotary axes, the development of a new measurement technique for the rotary axes of machine tools is highly urged.

Accordingly, the present invention provides a multi-degree-of-freedom error measurement system for rotary axes and the method thereof for solving the above problems. Thereby, machine tools can measure the x-axis radial error, the y-axis radial error, the axial error, the x-axis tilt error, the tilt error for the y-axis, and the angular alignment error for rotation. Then the purpose of enhancing the machining precision of machine tools can be achieved.

SUMMARY

An objective of the present invention is to provide a multi-degree-of-freedom error measurement system for rotary axes and the method thereof for providing optically measured multi-degree-of-freedom errors for rotary axes. Thereby, the precision of machine tools in rotary axes can be improved.

Another objective of the present invention is to provide a multi-degree-of-freedom error measurement system for rotary axes and the method thereof for providing rays incident to the optical device disposed on an axis average line. According to the motions of the rotary axes, a plurality of two-dimensional optoelectrical sensors receive positional variations of light spots. By means of analysis, the multi-degree-of-freedom errors can be deduced.

The present invention discloses a multi-degree-of-freedom error measurement system for rotary axes, which comprises a plurality of light sources, a multi-facet reflector, an axicon, a plurality of two-dimensional optoelectrical sensors, and an operational unit. The plurality of light sources produce a first ray, a second ray, and a third ray. The multi-facet reflector is disposed on an axis average line of the rotary axis. The first ray is incident to the multi-facet reflector, which reflects the first ray to give a reflective ray. The axicon is disposed on the multi-facet reflector. The second ray and the third ray are incident to the axicon and form a plurality of refractive rays and one or more reflective ray inside the axicon, respectively, for forming a first emitted ray and a second emitted ray. The plurality of two-dimensional optoelectrical sensors are disposed in the reflecting direction of the multi-facet reflectors and the first ray as well as in the emitting direction of the first emitted ray and the second emitted ray from the axicon. The rotation of the rotary axis changes the locations of the reflective ray, the first emitted ray, and the second emitted ray on the plurality of two-dimensional optoelectrical sensors. In addition, the operational unit is connected electrically to the plurality of two-dimensional optoelectrical sensors, and does statistics and calculations according to the location changes of the initial vectors of the first, second, and third rays, the plurality of refractive vectors and the one or more reflective vector of the first, second, and third rays, the reflective ray, and the first and second emitted rays on the plurality of two-dimensional optoelectrical sensors for giving a x-axis radial error, a y-axis radial error, an axial error, a x-axis tilt error, y-axis tilt error, and an angular alignment error for rotation.

According to an embodiment of the present invention, the operational unit calculates according to a ray tracing method and a first-order Taylor expansion equation to give the x-axis radial error, the y-axis radial error, the axial error, the x-axis tilt error, the tilt error for the y-axis, and the angular alignment error for rotation.

The present invention discloses a multi-degree-of-freedom error measurement system for rotary axes, which comprises a light source, an axicon, a two-dimensional optoelectrical sensor, and an operational unit. The light source produces an x-axis ray. The axicon is disposed on an axis average line and located on one side of a second splitter. The x-axis ray is incident to the axicon along an x-axis and produces one or more refraction for producing an x-axis emitted ray. The two-dimensional optoelectrical sensor is located in the emitting direction of the x-axis emitted ray for emitting the ray along the x-axis. The operational unit is connected to the two-dimensional optoelectrical sensor on the x-axis and calculates to give a x-axis radial error and a x-axis tilt error produced when the axis average line rotates according to the vector changes of the x-axis ray and the x-axis emitted ray on the two-dimensional optoelectrical sensor.

According to an embodiment of the present invention, the operational unit calculates according to a ray tracing method and a first-order Taylor expansion equation to give the x-axis radial error and the x-axis tilt error.

The present invention discloses a multi-degree-of-freedom error measurement system, which comprises a light source, an axicon, a two-dimensional optoelectrical sensor, and an operational unit. The light source produces a y-axis ray. The axicon is disposed on an axis average line and located on one side of a second splitter. The y-axis ray is incident to the axicon along a y-axis and produces one or more refraction for producing a y-axis emitted ray. The two-dimensional optoelectrical sensor is located in the emitting direction of the y-axis emitted ray for emitting the ray along the y-axis. The operational unit is connected to the two-dimensional optoelectrical sensor on the y-axis and calculates to give a y-axis radial error and y-axis tilt error produced when the rotary axis rotates according to the vector changes of the y-axis ray and the y-axis emitted ray on the two-dimensional optoelectrical sensor.

According to an embodiment of the present invention, the operational unit calculates according to a ray tracing method and a first-order Taylor expansion equation to give the y-axis radial error and the tilt error for the y-axis.

According to an embodiment of the present invention, the degree-of-freedom error measurement system for the x-axis further comprises a reflector disposed between a first splitter and the second splitter for reflecting the split ray emergent from the first splitter to the second splitter.

The present invention discloses a multi-degree-of-freedom error measurement system, which comprises a plurality of light sources, an axicon, a plurality of two-dimensional optoelectrical sensors, and an operational unit. The plurality of light sources produces an x-axis ray and a y-axis ray having different initial vectors. The axicon is disposed on an axis average line of the rotary axis and located at an intersection point of the second and third rays. The x-axis ray and the y-axis ray are incident to the axicon, respectively, for producing a plurality of refractive vectors and one or more reflective vector and producing an x-axis emitted ray and a y-axis emitted ray for emitting. There is an angle between the x-axis emitted ray and the y-axis emitted ray. The plurality of two-dimensional optoelectrical sensors receive the x-axis emitted ray and the y-axis emitted ray, respectively. The operation unit is connected electrically to the plurality of two-dimensional optoelectrical sensors and calculates to give a x-axis radial error, a y-axis radial error, a x-axis tilt error, and y-axis tilt error produced when the rotary axis rotates according to the vector changes of the x-axis ray and the y-axis ray and the vector changes of the x-axis emitted ray and the y-axis emitted ray on the plurality of two-dimensional optoelectrical sensors.

According to an embodiment of the present invention, the operational unit calculates according to a ray tracing method and a first-order Taylor expansion equation to give the x-axis radial error, the y-axis radial error, the x-axis tilt error, and the tilt error for the y-axis.

The present invention discloses a multi-degree-of-freedom error measurement system, which first produces a first ray, a second ray, and a third ray having different initial vectors. Next, the first, the second, and the third rays are output to a multi-facet reflector and an axicon. The multi-facet reflector produces a reflective ray according to the first ray. The axicon enables the second and the third rays to form one or more refractions and giving a first emitted ray and a second emitted ray. Then, a plurality of two-dimensional optoelectrical sensors are adapted to receive the reflective ray, the first emitted ray, and the second emitted ray. The rotation of the rotary axis drives the reflective ray, the first emitted ray, and the second emitted ray to produce incident position changes on the plurality of two-dimensional optoelectrical sensors. Finally, an operational unit does statistics and operations according to the vector changes of the plurality of initial vectors, the plurality of refractive vectors, the one or more reflective vectors, the reflective ray, the first emitted ray, and the second emitted ray for giving a x-axis radial error, a y-axis radial error, an axial error, a x-axis tilt error, y-axis tilt error, and an angular alignment error for rotation.

According to an embodiment of the present invention, the first ray, the second ray, and the third ray are driven to be incident to a multi-faced reflector on an axis average line and to an axicon. The second and third rays are transferred to the axicon along an x-axis and a y-axis of a coordinate system, respectively.

According to an embodiment of the present invention, the operational unit calculates according to the location changes of the light spots on the two-dimensional optoelectrical sensor incident by the reflective ray, the first emitted ray, and the second emitted ray. The operational unit does operation according to a plurality of refractive vectors and a plurality of reflective vectors of the first and second emitted rays converted from the first, the second, and the third rays and to a boundary vector of the axicon to give the x-axis radial error, the y-axis radial error, the axial error, the x-axis tilt error, the tilt error for the y-axis, and the angular alignment error for rotation.

BRIEF DESCRIPTION OF THE DRAWINGS

FIG. 4 shows a schematic diagram of x-axis ray shift due to rotation of the axicon according to the present invention;

FIG. 10B shows an enlarged view of FIG. 10A;

DETAILED DESCRIPTION

In order to make the structure and characteristics as well as the effectiveness of the present invention to be further understood and recognized, the detailed description of the present invention is provided as follows along with embodiments and accompanying figures.

Figure 1:
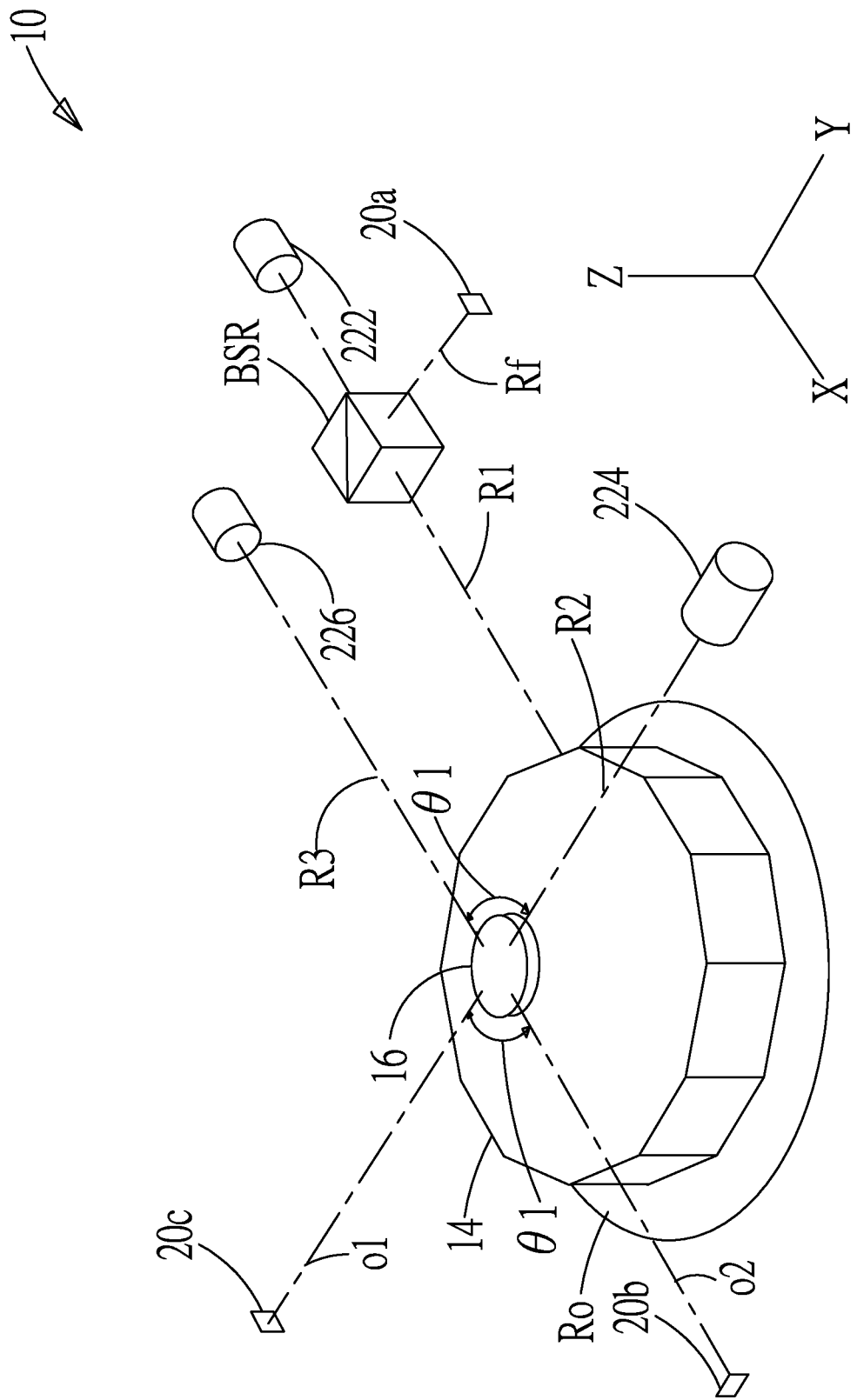
FIG. 1 shows a schematic diagram of the multi-degree-of-freedom error measurement system according to a preferred embodiment of the present invention.

Please refer to FIG. 1, which shows a schematic diagram of the multi-degree-of-freedom error measurement system according to a preferred embodiment of the present invention. The multi-degree-of-freedom error measurement system 10 includes a second light source module 22. As shown in the figure, the multi-degree-of-freedom error measurement system according to the present embodiment includes a first light source 222, a second light source 224, and a third light source 226 for producing a first ray R1, a second ray R2, and a third ray R3. Besides, the present embodiment further includes a splitter BSR.

The first light source 222 produces the first ray R1, which passes through the splitter BSR for outputting to the multi-facet reflector 14, reflecting the reflective ray Rf back to the splitter BSR, and outputting the reflective ray Rf to the first two-dimensional optoelectrical sensor 20a. The second light source 224 produces the second ray R2, which passes through the axicon 16. By refraction of the axicon 16, the first emitted ray o1 is formed. The third ray 226 produces the third ray R3, which also passes through the axicon 16. Likewise, by refraction of the axicon 16, the second emitted ray o2 is formed. In addition, there is an angle θ, for example, between 45 and 135 degrees, at the incident point between the second ray R2 and the third ray R3. There is also an angle θ at the emergent point between the first emitted ray o1 and the second emitted ray o2. The first emitted ray o1 and the second emitted ray o2 are incident to the second two-dimensional optoelectrical sensor 20b and the third two-dimensional optoelectrical sensor 20c, respectively.

The second ray R2 and the third ray R3 are equivalent to a y-axis ray and an x-axis ray, respectively.

Figure 2:
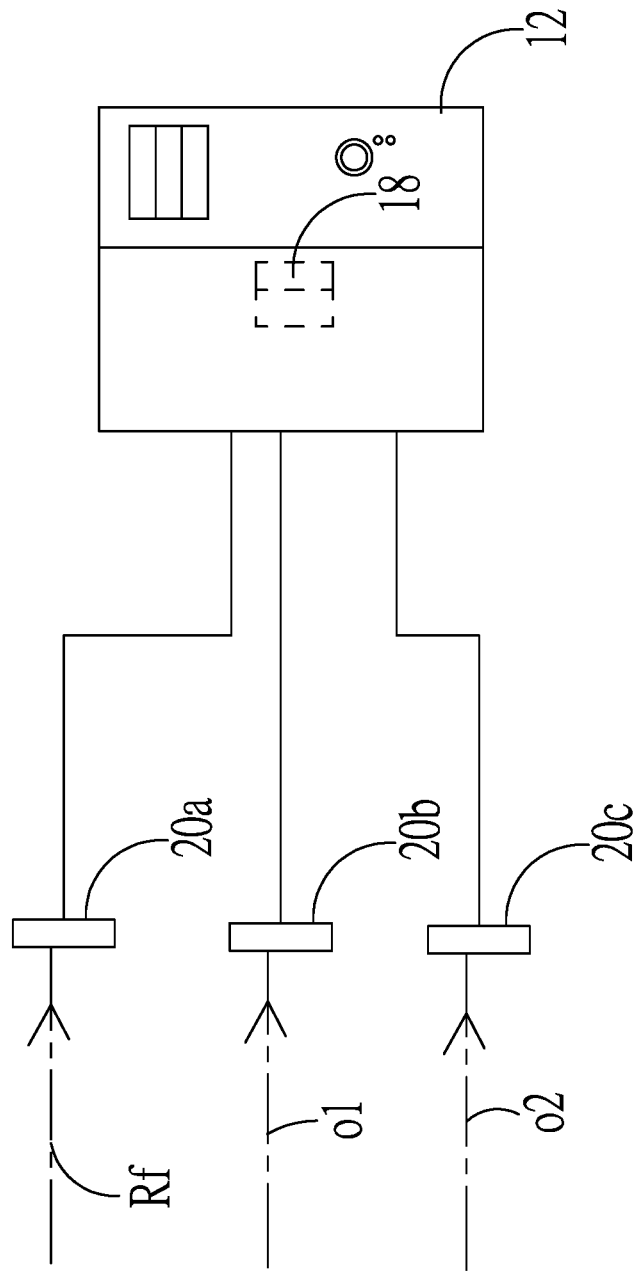
FIG. 2 shows a schematic diagram of the two-dimensional optoelectrical sensors connected with the operational unit according to a preferred embodiment of the present invention.

As shown in FIG. 2, the first two-dimensional optoelectrical sensor 20a, the second two-dimensional optoelectrical sensor 20b, and the third two-dimensional optoelectrical sensor 20c are connected to a host H, respectively, for the operational unit 18 to perform calculations. Namely, the first two-dimensional optoelectrical sensor 20a, the second two-dimensional optoelectrical sensor 20b, and the third two-dimensional optoelectrical sensor 20c are connected electrically to the operational unit 18, so that the operational unit 18 can read the sensing results of the first two-dimensional optoelectrical sensor 20a, the second two-dimensional optoelectrical sensor 20b, and the third two-dimensional optoelectrical sensor 20c on the reflective ray Rf, the first emitted ray o1, and the second emitted ray o2. Then the operational unit 18 can calculate to give the multi-degree-of-freedom errors of the axis average line Ro, such as the x-axis radial error, the y-axis radial error, the axial error, the x-axis tilt error, the tilt error for the y-axis, and the angular alignment error for rotation.

The first two-dimensional optoelectrical sensor 20a, the second two-dimensional optoelectrical sensor 20b, and the third two-dimensional optoelectrical sensor 20c described above are two-dimensional optoelectrical sensors. They can be charge coupled devices (CCD), contact image sensors (CIS), complementary metal-oxide-semiconductor (CMOS) active-matrix transducers, or other electronic devices capable of converting optical images to electric signals.

Figure 3A:
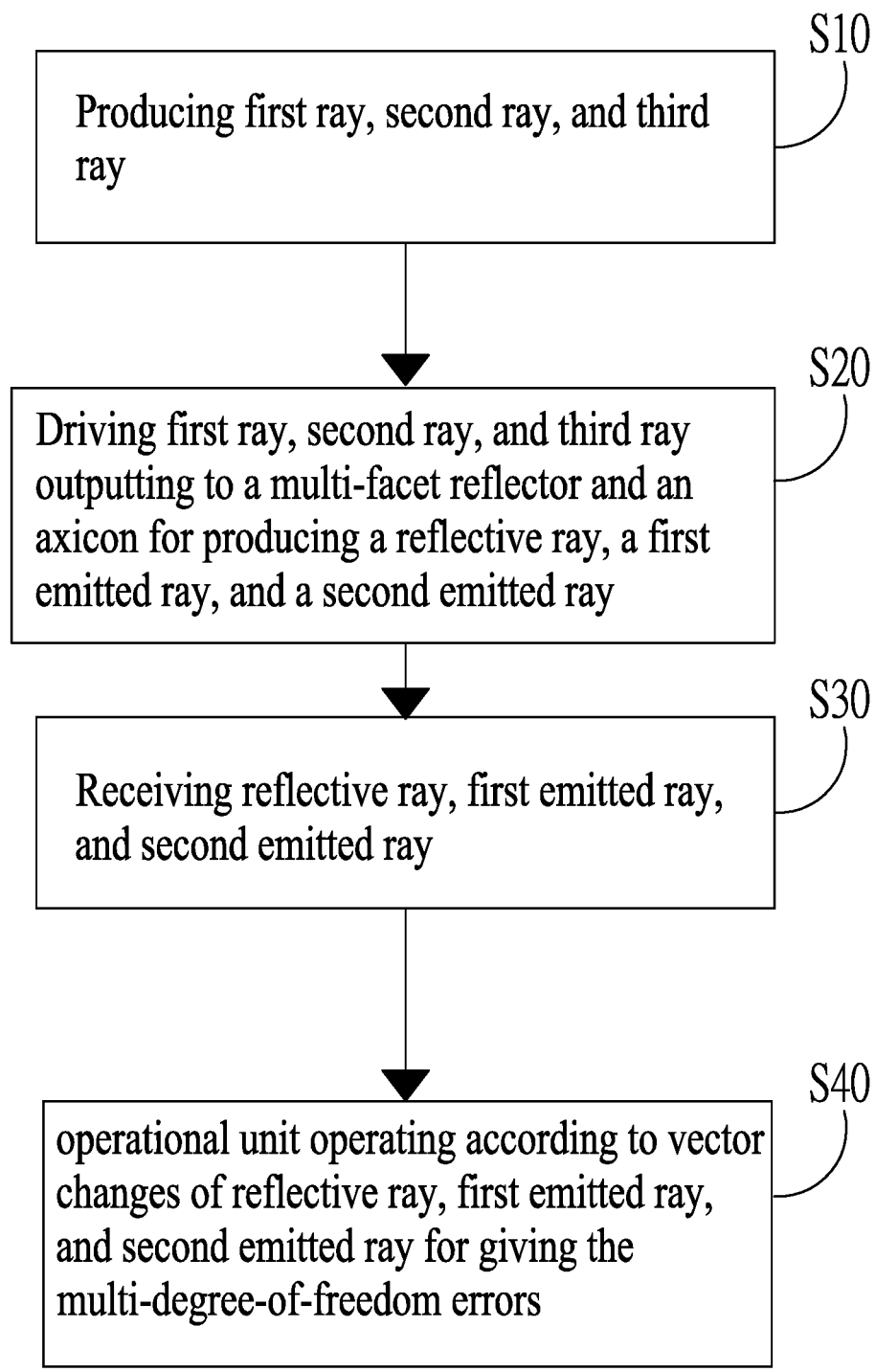
FIG. 3A shows a flowchart according to a preferred embodiment of the present invention.

Please refer to FIG. 3A, which shows a flowchart according to a preferred embodiment of the present invention, as well as to FIG. 2. According to the multi-degree-of-freedom error measurement method of the present invention, the multi-degree-of-freedom error measurement system 10 is used to measure the multi-degree-of-freedom error of an axis average line Ro, such as the x-axis radial error, the y-axis radial error, the axial error, the x-axis tilt error, the tilt error for the y-axis, and the angular alignment error for rotation. The multi-degree-of-freedom error measurement method according to the present invention comprises the following steps:

Step S10: Producing a first ray, a second ray, and a third ray;

Step S20: Driving the first ray, the second ray, and the third ray to output to a multi-facet reflector and an axicon for producing a reflective ray, a first emitted ray, and a second emitted ray;

Step S30: Two-dimensional optoelectrical sensors receiving the reflective ray, the first emitted ray, and the second emitted ray; and Step S40: An operational unit does operation according to the location changes of the light spots of the reflective ray, the first emitted ray, and the second emitted ray on the first two-dimensional optoelectrical sensor 20a, the second two-dimensional optoelectrical sensor 20b, and the third two-dimensional optoelectrical sensor 20c for giving the x-axis radial error, the y-axis radial error, the axial error, the x-axis tilt error, the tilt error for the y-axis, and the angular alignment error for rotation.

Figure 3B:
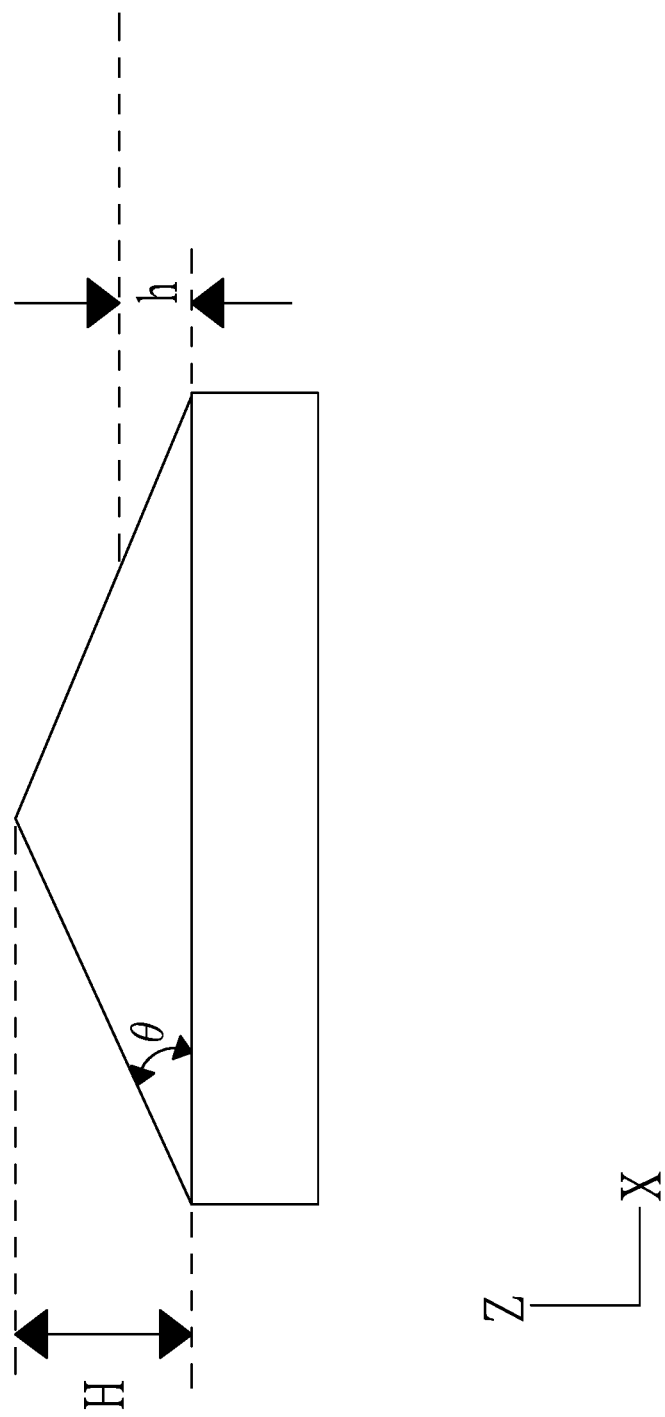
FIG. 3B shows a schematic diagram of the optical path of the axicon on the XZ plane according to a preferred embodiment of the present invention.

In the step S10, as shown in FIG. 2, a plurality of light sources 222, 224, 226 produce the first ray R1, the second ray R2, and the third R3 and output them to the multi-facet reflector 14 and the axicon 16. Next, in the step S20, the first ray R1 passes through the splitter BSR and is output to the multi-facet reflector 14. Next, in the step S30, the multi-facet reflector 14 reflects the first ray R1 for forming the reflective ray Rf, reflecting back to the splitter BSR, and transmitting to the first two-dimensional optoelectrical sensor 20a. The second ray R2 and the third ray R3 are also named the y-axis ray and the x-axis ray, respectively, and pass through the axicon 16 along the y-axis and the x-axis. After two or more refractions and one reflection in the axicon 16, the first emitted ray o1 and the second emitted ray o2 will be formed, respectively, and input to the second two-dimensional optoelectrical sensor 20b and the third two-dimensional optoelectrical sensor 20c. Finally, in the step S40, the operational unit 18 operates the light path according to the location changes of the light spots of the reflective ray, the first emitted ray, and the second emitted ray on the plurality of two-dimensional optoelectrical sensors for giving errors in a plurality of degrees of freedom as the axis average line rotates. Furthermore, the operational unit can operate the light path to give errors in a plurality of degrees of freedom according to a ray tracing method. As shown in FIG. 3B, the boundary curve of the cone surface can be represented as $^i\bar{q}_i$, meaning the curve of the ith surface boundary in the optical system. This curve can be expressed as:

$$^i\bar{q}_i = \begin{bmatrix} x_i \\ 0 \\ z_i \\ 1 \end{bmatrix} = \begin{bmatrix} (H-h)\cot\theta \\ 0 \\ h \\ 1 \end{bmatrix}, 0 \leq h < H, \quad (1)$$

-continued $$^i\eta_i = \begin{bmatrix} \eta_{ix} \\ \eta_{iy} \\ \eta_{iz} \\ 0 \end{bmatrix} = S_i \begin{bmatrix} \sin\theta \\ 0 \\ \cos\theta \\ 0 \end{bmatrix} \quad (2)$$

where H=½d tan θ; d is the diameter of the axicon; θ=(180°−apical angle)/2.

Figure 3C:
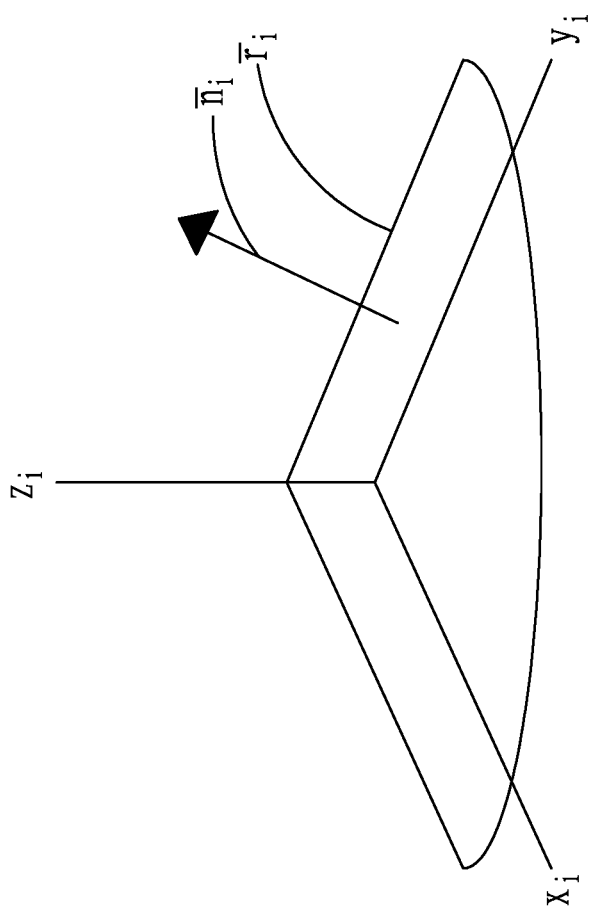
FIG. 3C shows a schematic diagram of the coordinates and the boundary vector according to a preferred embodiment of the present invention.

As shown in FIG. 3C, the surface boundary parameter $^i\bar{r}_i$ of the cone and its unit normal vector $^i\bar{n}_i$ can be expressed by observing the surface boundary curve $^i\bar{q}_i$ of the cone and rotating $^i\bar{\eta}_i$ about the $z_i$-axis by an angle α (0≤α$_i$≤2π). Namely, $$^i\bar{r}_i = \begin{bmatrix} x_i \\ y_i \\ z_i \\ 1 \end{bmatrix} = rot(\bar{z}, \alpha_i) \quad (3)$$

$$^i\bar{q}_i = \begin{bmatrix} C\alpha_i & -S\alpha_i & 0 & 0 \\ S\alpha_i & C\alpha_i & 0 & 0 \\ 0 & 0 & 1 & 0 \\ 0 & 0 & 0 & 1 \end{bmatrix} \begin{bmatrix} (H-h)\cot\theta \\ 0 \\ h \\ 1 \end{bmatrix} = \begin{bmatrix} (H-h)\cot\theta C\alpha_i \\ (H-h)\cot\theta S\alpha_i \\ h \\ 1 \end{bmatrix},$$

$$^i\bar{n}_i = rot(\bar{z}, \alpha_i)^i\bar{\eta}_i = s_i \begin{bmatrix} C\alpha_i & -S\alpha_i & 0 & 0 \\ S\alpha_i & C\alpha_i & 0 & 0 \\ 0 & 0 & 1 & 0 \\ 0 & 0 & 0 & 1 \end{bmatrix} \begin{bmatrix} \sin\theta \\ 0 \\ \cos\theta \\ 1 \end{bmatrix} = s_i \begin{bmatrix} \sin\theta C\alpha_i \\ \sin\theta S\alpha_i \\ \cos\theta \\ 0 \end{bmatrix}, \quad (4)$$

The above two equations (3), (4) are parametric equations for expressing the surface boundary parameter $^i\bar{r}_i$ of the cone and its unit normal vector $^i\bar{n}_i$. In the deducing process of the skew ray tracing method, a homogeneous transformation matrix (HTM) is adopted for converting the optical surface coordinates i(xyz) to the global coordinates (xyz). Namely, $$^i\bar{A}_i = tran(t_{ix}, 0, 0)^i tran(0, t_{iy}, 0)tran \quad (5)$$

$(0, 0, t_{iz})_i rot(\bar{z}, w_{iz})^i rot(\bar{y}, w_{iy})rot(\bar{x}, w_{iz})_i =$ $$\begin{bmatrix} Cw_{iz}Cw_{iy} & Cw_{iz}Sw_{iy}Sw_{ix} - Sw_{iz}Cw_{ix} & Cw_{iz}Sw_{iy}Cw_{ix} & t_{ix} \\ Sw_{iz}Cw_{iy} & Sw_{iz}Sw_{iy}Sw_{ix} + Cw_{iz}Cw_{ix} & Sw_{iz}Sw_{iy}Sw_{ix} - & \\ & & Sw_{iz}Cw_{ix} & t_{iy} \\ -Sw_{iy} & Cw_{iy}Sw_{ix} & Cw_{iy}Cw_{ix} & t_{iz} \\ 0 & 0 & 0 & 1 \end{bmatrix} =$$

$$\begin{bmatrix} I_{ix} & J_{ix} & K_{ix} & t_{ix} \\ I_{iy} & J_{iy} & K_{iy} & t_{iy} \\ I_{iz} & J_{iz} & K_{iz} & t_{iz} \\ 0 & 0 & 0 & 1 \end{bmatrix}$$

In addition, the second ray R2 or the third ray R3 are incident at the incident point $\bar{P}_{i-1}$ (on the previous surface $\bar{r}_{i-1}$) into the axicon 16. In other words, for the axicon, the second ray R2 and the third ray R3 emerge from the incident point $\bar{P}_{i-1}$ (on the previous surface $\bar{r}_{i-1}$). Concurrently, the emitted ray will be transferred along the unit normal vector $\bar{I}_{i-1}$. When the rays are incident to the surface $\bar{r}_i$, reflection or refraction will occur. $P_i$ means the location of light spot on the optical boundary i. $\bar{P}_{i-1}$ is just each point of the incident ray. Thereby, the ray starts from $\bar{P}_{i-1}$. Accordingly, $\bar{P}'_{i-1}=$ $\bar{P}_{i-1}+\lambda \bar{I}_{i-1}$. Given the parameter $\lambda_i = \lambda_i$ and the incident ray being $\bar{P}_{i-1}$, the vector of the incident ray $\bar{P}_{i-1}$ incident to the boundary surface $\bar{r}_i$ will be:

$$\bar{P}_i = \begin{bmatrix} P_{ix} \\ P_{ix} \\ P_{iz} \\ 1 \end{bmatrix} = \begin{bmatrix} P_{i-1x} + \lambda_i l_{i-1x} \\ P_{i-1x} + \lambda_i l_{i-1y} \\ P_{i-1x} + \lambda_i l_{i-1z} \\ 1 \end{bmatrix} = \bar{P}_{i-1} + \lambda \bar{l}_{i-1} \quad (6)$$

Substituting the result of Equation (5) into $^i\bar{P}_i = {}^i\bar{A}_0\bar{P}_i = ({}^0\bar{A}_i)^{-1}\bar{P}_i$ gives:

$$^i\bar{P}_i = = \begin{bmatrix} I_{ix} & J_{ix} & K_{ix} & -(I_{ix}t_{ix}+I_{iy}t_{iy}+I_{iz}t_{iz}) \\ I_{iy} & J_{iy} & K_{iy} & -(J_{ix}t_{ix}+J_{iy}t_{iy}+J_{iz}t_{iz}) \\ I_{iz} & J_{iz} & K_{iz} & -(K_{ix}t_{ix}+K_{iy}t_{iy}+K_{iz}t_{iz}) \\ 0 & 0 & 0 & 1 \end{bmatrix} \quad (7)$$

$$\begin{bmatrix} P_{i-1x} + \lambda_i l_{i-1x} \\ P_{i-1x} + \lambda_i l_{i-1y} \\ P_{i-1x} + \lambda_i l_{i-1z} \\ 1 \end{bmatrix} = \begin{bmatrix} \sigma_i \\ \rho_i \\ \tau_i \\ 1 \end{bmatrix} = {}^i\bar{P}_i = \begin{bmatrix} (H-h)\cot 20°\cos\alpha_i \\ (H-h)\cot 20°\sin\alpha_i \\ h \\ 1 \end{bmatrix}$$

where $$\sigma_i = I_{ix}(P_{i-1x} + \lambda_i l_{i-1x}) + I_{iy}(P_{i-1y} + \lambda_i l_{i-1y}) + \quad (8)$$
$$I_{iz}(P_{i-1z} + \lambda_i l_{i-1z}) - (I_{ix}t_{ix} + I_{iy}t_{iy} + I_{iz}t_i) =$$
$$I_{ix}P_{ix} + I_{iy}P_{iy} + I_{iz}P_{iz} - (I_{ix}t_{ix} + I_{iy}t_{iy} + I_{iz}t_{iz})$$

$$\rho_i = J_{ix}(P_{i-1x} + \lambda_i l_{i-1x}) + J_{iy}(P_{i-1y} + \lambda_i l_{i-1y}) + \quad (9)$$
$$J_{iz}(P_{i-1z} + \lambda_i l_{i-1z}) - (J_{ix}t_{ix} + J_{iy}t_{iy} + J_{iz}t_{iz}) =$$
$$J_{ix}P_{ix} + J_{iy}P_{iy} + J_{iz}P_{iz} - (J_{ix}t_{ix} + J_{iy}t_{iy} + J_{iz}t_{iz})$$

$$\tau_i = K_{ix}(P_{i-1x} + \lambda_i l_{i-1x}) + K_{iy}(P_{i-1y} + \lambda_i l_{i-1y}) + \quad (10)$$
$$K_{iz}(P_{i-1z} + \lambda_i l_{i-1z}) - (K_{ix}t_{ix} + K_{iy}t_{iy} + K_{iz}t_{iz}) =$$
$$K_{ix}P_{ix} + K_{iy}P_{iy} + K_{iz}P_{iz} - (K_{ix}t_{ix} + K_{iy}t_{iy} + K_{iz}t_{iz})$$

By operating the following equation:

$$\sigma^2 + \rho^2 + \tau(2H\cot^2 20°) - \tau^2\cot^2 20° = H^2\cot^2 20° \quad (11)$$

The solution gives:

$$\lambda_i = \frac{-D_i \pm \sqrt{D_i^2 - E_i F_i}}{F_i} \quad (12)$$

where $$D_i = (I_{ix}l_{i-1x} + I_{iy}l_{i-1y} + I_{iz}l_{i-1z}) \quad (13)$$
$$[I_{ix}(P_{i-1x} - t_{ix}) + I_{iy}(P_{i-1y} - t_{iy}) + I_{iz}(P_{i-1z} - t_{iz})] +$$
$$(J_{ix}l_{i-1x} + J_{iy}l_{i-1y} + J_{iz}l_{i-1z})[J_{ix}(P_{i-1x} - t_{ix}) + J_{iy}(P_{i-1y} - t_{iy}) +$$
$$J_{iz}(P_{i-1z} - t_{iz})] -$$
$$(K_{ix}l_{i-1x} + K_{iy}l_{i-1y} + K_{iz}l_{i-1z})[K_{ix}(P_{i-1x} - t_{ix}) +$$
$$K_{iy}(P_{i-1y} - t_{iy}) +$$
$$K_{iz}(P_{i-1z} - t_{iz}) - H]\cot^2\theta$$

$$E_i = [I_{ix}(P_{i-1x} - t_{ix}) + I_{iy}(P_{i-1y} - t_{iy}) + I_{iz}(P_{i-1z} - t_{iz})]^2 + \quad (14)$$
$$[J_{ix}(P_{i-1x} - t_{ix}) + J_{iy}(P_{i-1y} - t_{iy}) + J_{iz}(P_{i-1z} - t_{iz})]^2 -$$
$$[K_{ix}(P_{i-1x} - t_{ix}) + K_{iy}(P_{i-1y} - t_{iy}) + K_{iz}(P_{i-1z} - t_{iz}) - H]^2\cot^2\theta$$

$$D_i = (I_{ix}l_{i-1x} + I_{iy}l_{i-1y} + I_{iz}l_{i-1z})^2 + (J_{ix}l_{i-1x} + J_{iy}l_{i-1y} + J_{iz}l_{i-1z})^2 - \quad (15)$$
$$(K_{ix}l_{i-1x} + K_{iy}l_{i-1y} + K_{iz}l_{i-1z})^2\cot^2\theta$$

The negative real number $\lambda_i$ is the length of the vector from the light source $\overline{P}_{i-1}$ to the incident point $\overline{P}_i$. The symbol "±" in Equation (12) means the two intersection points of a ray passing through a sphere. In particular, the known $$\lambda_i = \frac{-D_i - \sqrt{D_i^2 - E_i F_i}}{F_i}$$

represents the nearer intersection point while $$\lambda_i = \frac{-D_i + \sqrt{D_i^2 - E_i F_i}}{F_i}$$

represent the farther. In addition, according to $\rho^2+\sigma^2\neq 0$, the $\alpha_i$ in the incident point $\overline{P}_i$ can be given by solving the following equation:

$$\alpha_i = \alpha \tan 2(\rho_i, \sigma_i) \quad (16)$$

Thereby, according to the above skew ray tracing theory and the homogenous transformation matrix (HTM) of the optical boundaries for the global coordinate system as constructed in Equations (17), (18), the emitted rays from the optical modules can be traced, giving the coordinates of the light spots on the three two-dimensional optoelectrical sensors.

$$A'_{G1} = {}^0\overline{A}_i A_{G1} = \begin{bmatrix} I_{1x} & J_{1x} & K_{1x} & t_{1x} \\ I_{1y} & J_{1y} & K_{1y} & t_{1y} \\ I_{1z} & J_{1z} & K_{1z} & t_{1z} \\ 0 & 0 & 0 & 1 \end{bmatrix} \quad (17)$$

$$A'_{G2} = {}^0\overline{A}_i A_{G2} = \begin{bmatrix} I_{2x} & J_{2x} & K_{2x} & t_{2x} \\ I_{2y} & J_{2y} & K_{2y} & t_{2y} \\ I_{2z} & J_{2z} & K_{2z} & t_{2z} \\ 0 & 0 & 0 & 1 \end{bmatrix} \quad (18)$$

$$A'_{G3} = {}^0\overline{A}_i A_{G3} = \begin{bmatrix} I_{3x} & J_{3x} & K_{3x} & t_{3x} \\ I_{3y} & J_{3y} & K_{3y} & t_{3y} \\ I_{3z} & J_{3z} & K_{3z} & t_{3z} \\ 0 & 0 & 0 & 1 \end{bmatrix} \quad (19)$$

Hence, for the first emitted ray and the second emitted ray of the axicon 16, the operational unit 18 can calculates to give the x-axis radial error, the y-axis radial error, the axial error, the x-axis tilt error, the tilt error for the y-axis, and the angular alignment error for rotation.

Figure 5:
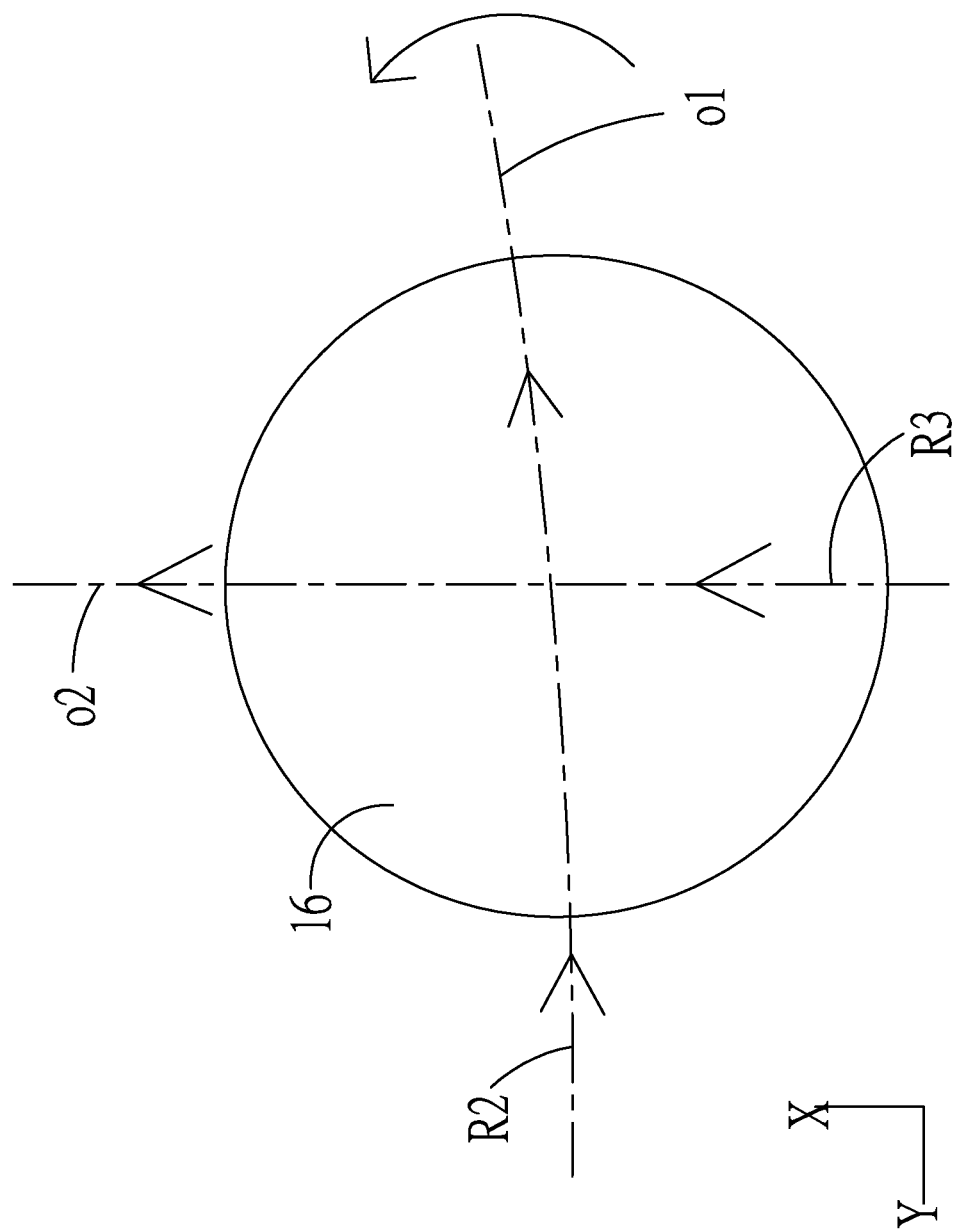
FIG. 5 shows a schematic diagram of y-axis ray shift due to rotation of the axicon according to the present invention.

Next, please refer to the following figures, which show shifts of the emitted rays caused by rotation by the axicon 16 is driven by the axis average line Ro. When the average axis moves, there is no relative displacement between the axis average line and the axicon as well as the multi-faced reflector. Please refer to FIG. 4. As the axis average line rotates, due to errors in the movement of the axis average line, the axicon 16 according to the present invention will have errors. As shown in the figure, a top view of the axicon 16 according to the present invention is illustrated. The second ray R2 and the third ray R3 are incident to the axicon 16 along the y-axis and x-axis and emergent from the axicon 16 to give the first emitted ray o1 and the second emitted ray o2. When the axicon 16 has a x-axis tilt error, the emitting direction of the second emitted ray o2 will be shifted as influenced by the rotation of the axicon 16 towards the x-axis. Please refer to FIG. 5, which shows a schematic diagram of y-axis ray shift due to an error of the axicon according to the present invention. The transferring manner of the first emitted ray o1 and the second emitted ray o2 are the same as the one in the above embodiment. Hence, the details will not be described again. The axicon 16 in FIG. 5 rotates towards the y-axis. Thereby, the emitting direction of the first emitted ray o1 will be shifted as influenced by the rotation of the axicon 16 towards the y-axis.

Figure 6:
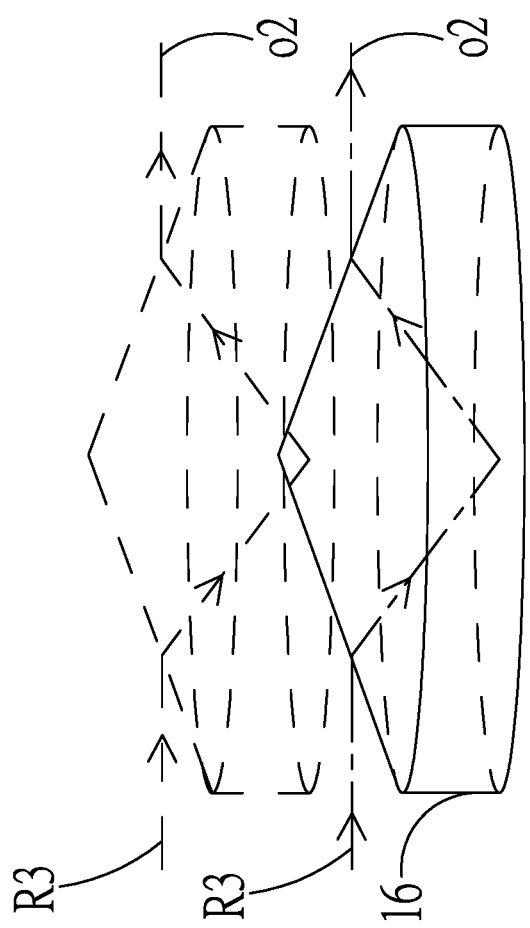
FIG. 6 shows a schematic diagram of ray shift due to vibration of the axicon in the z-axis according to the present invention.

Please refer to FIG. 6, which shows a schematic diagram of ray shift due to an axial error of the axicon in the z-axis according to the present invention. As shown in the figure, the axicon 16 receives the second ray R2 and the third ray R3 coming from the y-axis and x-axis directions, respectively. In FIG. 6, the third ray R3 and the second emitted ray o2 transferred in the x-axis direction are taken as an example. During the rotating process of the axis average line Ro (as shown in FIG. 2), a radial error, namely, a z-axis displacement, will occur, making the axicon 16 to produce a radial displacement in the z-axis. Consequently, the emergent vector and location of the second emitted ray o2 will change.

Figure 7:
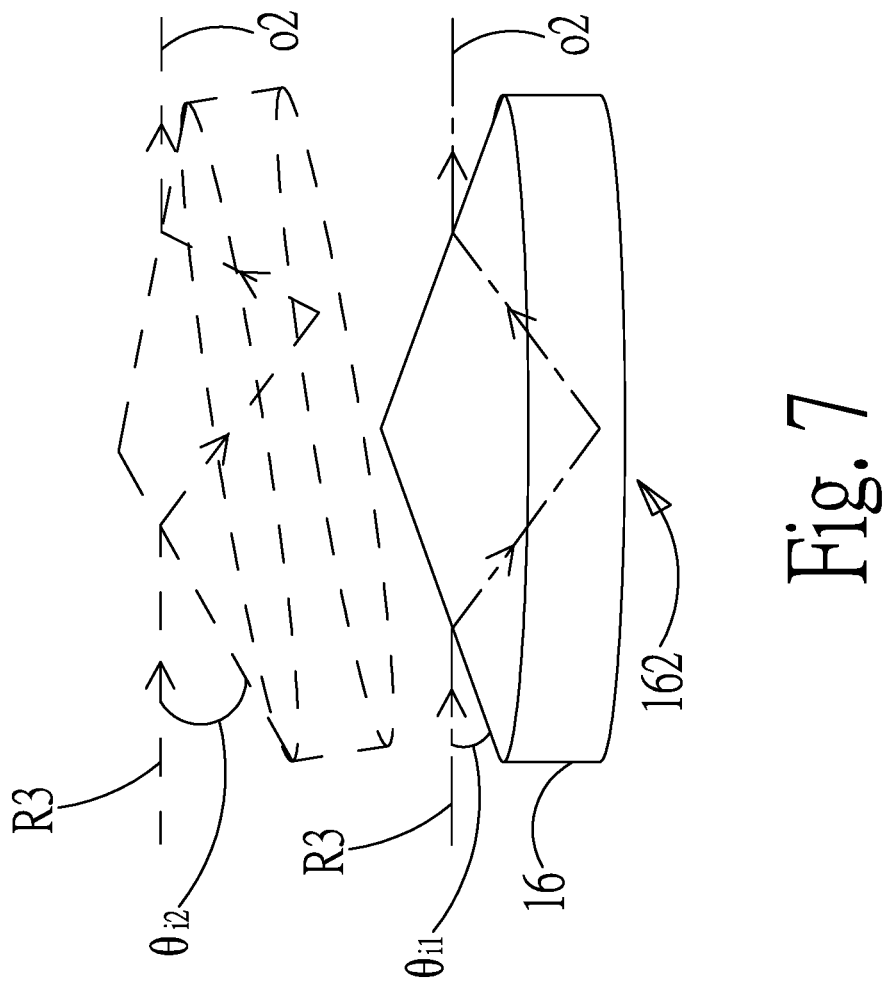
FIG. 7 shows a schematic diagram of ray shift due to forward tilt of the axicon according to the present invention.
Figure 8:
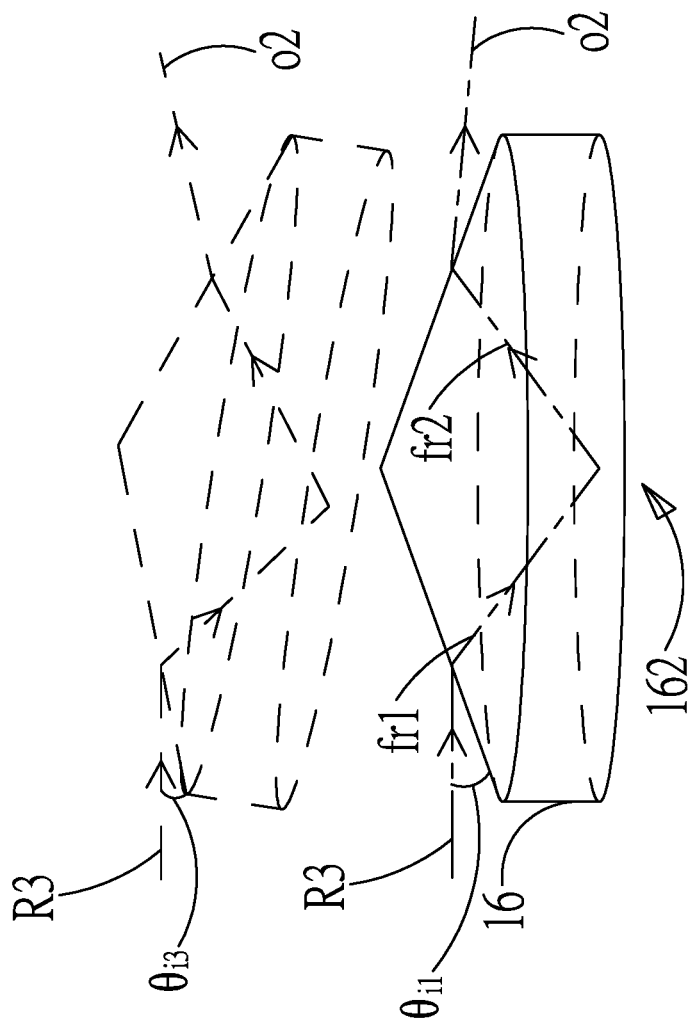
FIG. 8 shows a schematic diagram of ray shift due to backward tilt of the axicon according to the present invention.

As shown in FIG. 7 and FIG. 8, which show schematic diagrams of ray shifts due to tilts for the x-axis and the y-axis of the axicon according to the present invention. In FIGS. 7 and 8, the third ray R3 and the second emitted ray o2 transferred in the x-axis are taken as an example. When the third ray R3 is incident to one side of the axicon 16, after one refraction, a first internal ray fr1 is formed, transmitted to the bottom 162, reflected by the bottom 162, and forming a second internal ray fr2. The second internal ray fr2 is transmitted to the other side of the axicon 16, refracted to emit from the axicon 16, and forming the second emitted ray o2. When the axicon 16 is not tilt, there is a first incident angle $\theta_{i1}$ between the third ray R3 and the axicon 16. As the axicon 16 is tilt in the reverse direction of the x-axis, namely, as the axicon 16 is tilt forward, there is a second incident angle $\theta_{i2}$ between the third ray R3 and the axicon 16. As the axicon 16 is tilt toward the x-axis, namely, as the axicon 16 is tilt backward, there is a third incident angle $\theta_{i3}$ between the third ray R3 and the axicon 16. The third incident angle $\theta_{i3}$ is smaller than the second incident angle $\theta_{i2}$ and the first incident angle $\theta_{i1}$. That is to say, the incident angle will vary owing to the tilt of the axicon 16 and thus influencing the x-axis tilt error. In the above description, the x-axis tilt error is taken as an example. The influence of the variation in incident angle on the tilt error for the y-axis is similar to the influence on the x-axis tilt error, as the example described above.

Figure 9A:
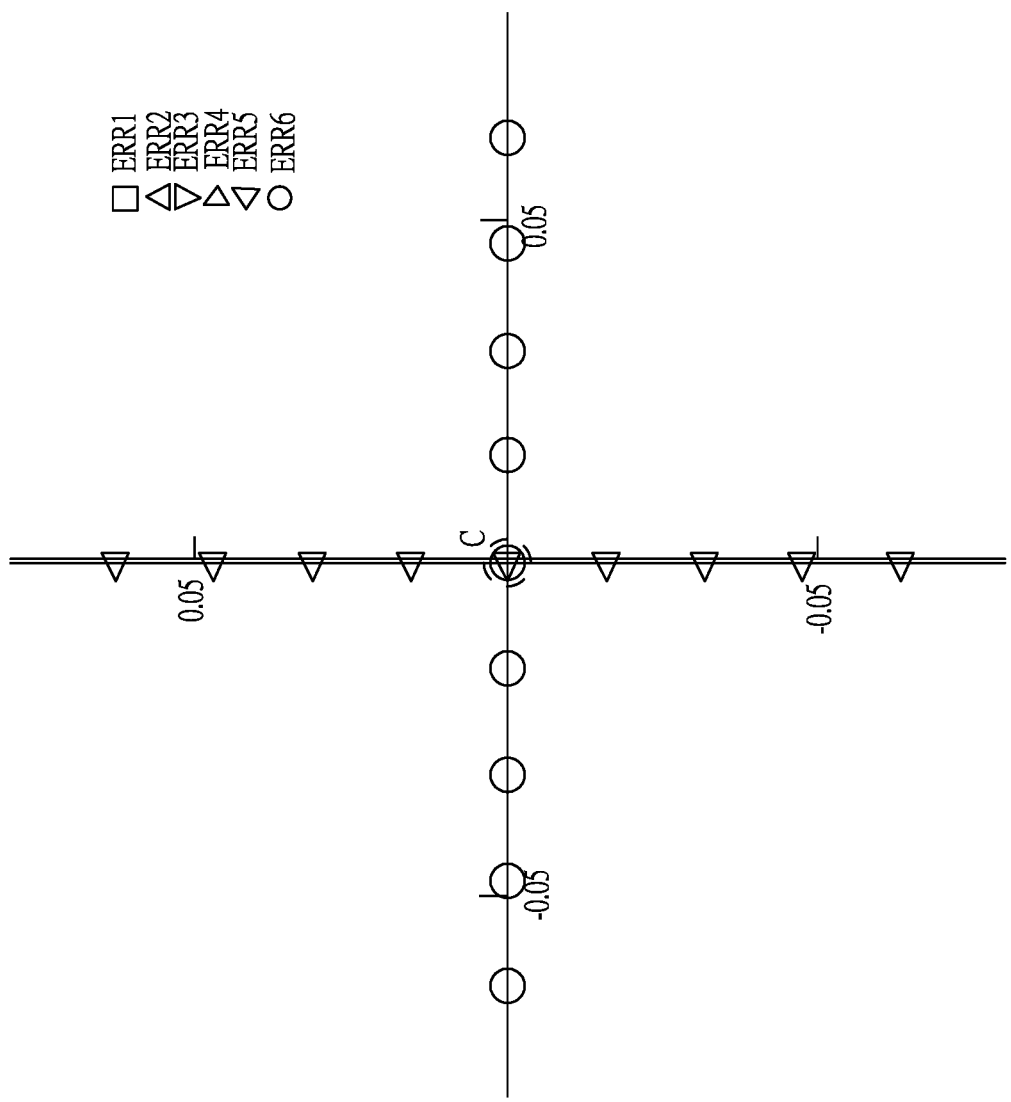
FIG. 9A shows a schematic diagram of the sensing results of the first two-dimensional optoelectrical sensor according to the present invention.
Figure 9B:
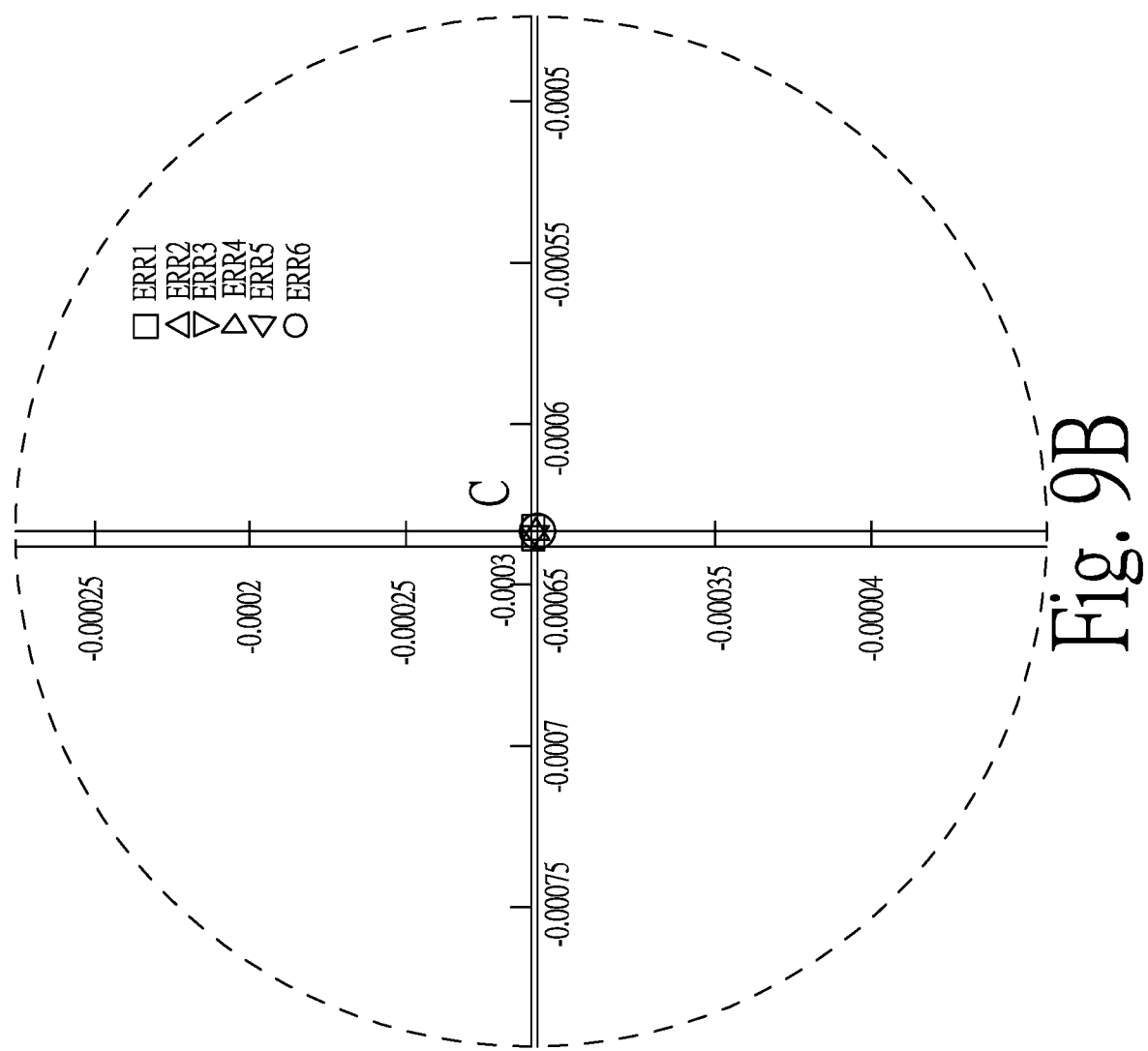
FIG. 9B shows an enlarged view of FIG. 9A.
Figure 10A:
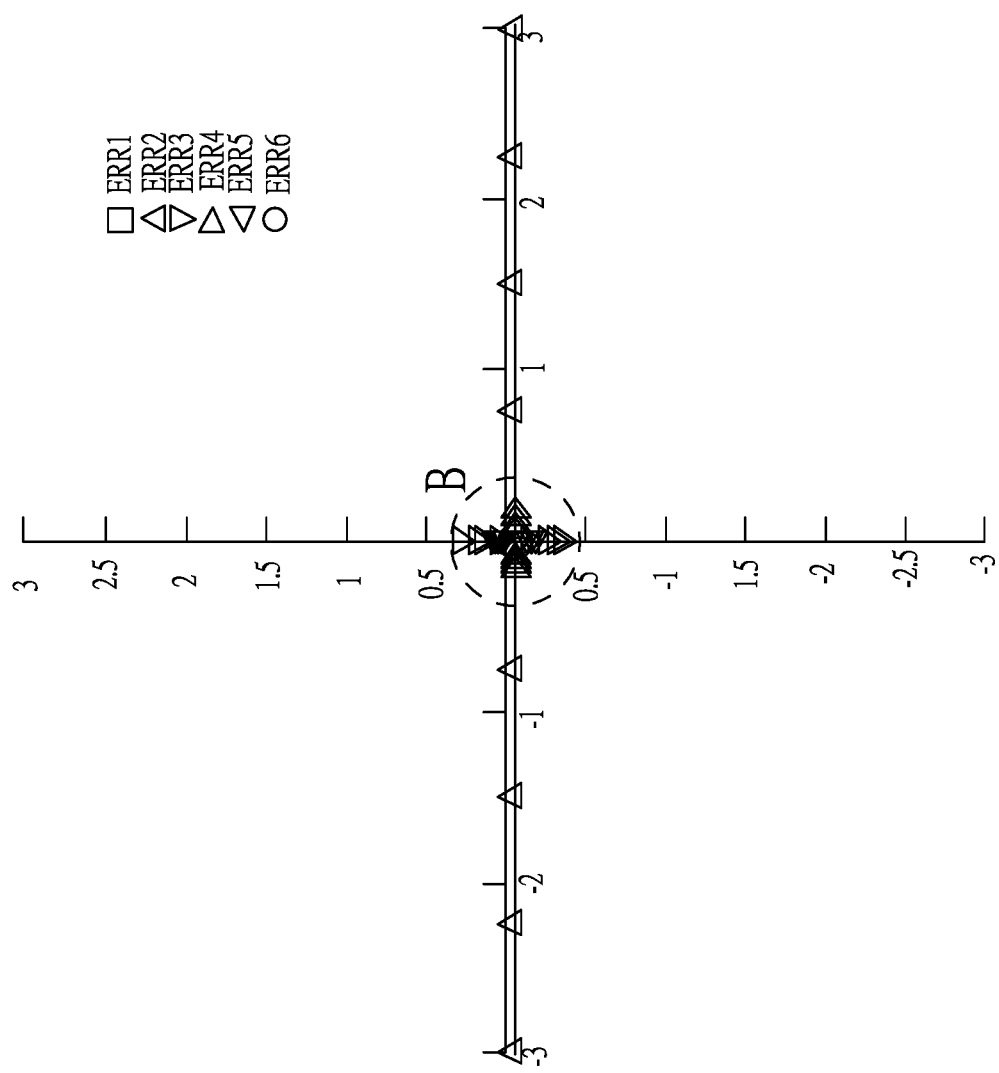
FIG. 10A shows a schematic diagram of the sensing results of the second two-dimensional optoelectrical sensor according to the present invention.
Figure 11A:
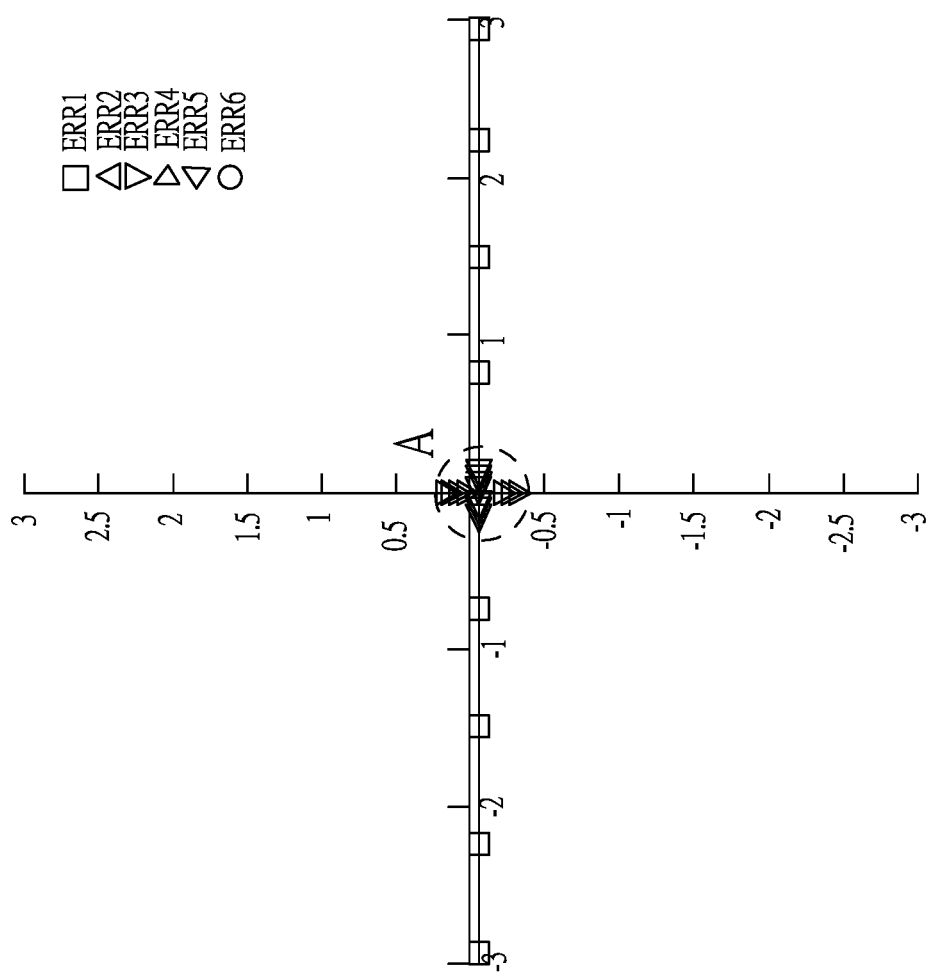
FIG. 11A shows a schematic diagram of the sensing results of the third two-dimensional optoelectrical sensor according to the present invention.

As shown in FIGS. 9A, 10A, and 11A, according to the above embodiment of the present invention, the sensing results of the first two-dimensional optoelectrical sensor 20a to the third two-dimensional optoelectrical sensor 20c sensing errors in a plurality of degrees of freedom, namely, the x-axis radial error ERR1, the y-axis radial error ERR2, the axial error ERR3, the x-axis tilt error ERR4, the tilt error for the y-axis ERR5, and the angular alignment error for rotation ERR6. As shown in FIG. 9A, the tilt error for the y-axis ERR5 is distributed vertically and close to the vertical axis; the angular alignment error for rotation ERR6 is distributed horizontally and close to the horizontal axis. FIG. 9B further shows an enlarged view of the zone C.

As shown in FIG. 10A, the y-axis radial error ERR2 is distributed horizontally on the frame. Most errors, such as the axial error ERR3, the x-axis tilt error ERR4, the tilt error for the y-axis ERR5, and the angular alignment error for rotation ERR6, are distributed in the zone B. Furthermore, as shown in FIG. 10B, when the axis average line has the angular alignment error for rotation ERR6, the location of light spots is always at the coordinates (0.001, −0.06). In other words, the angular error will not influence the second emitted ray.

Figure 11B:
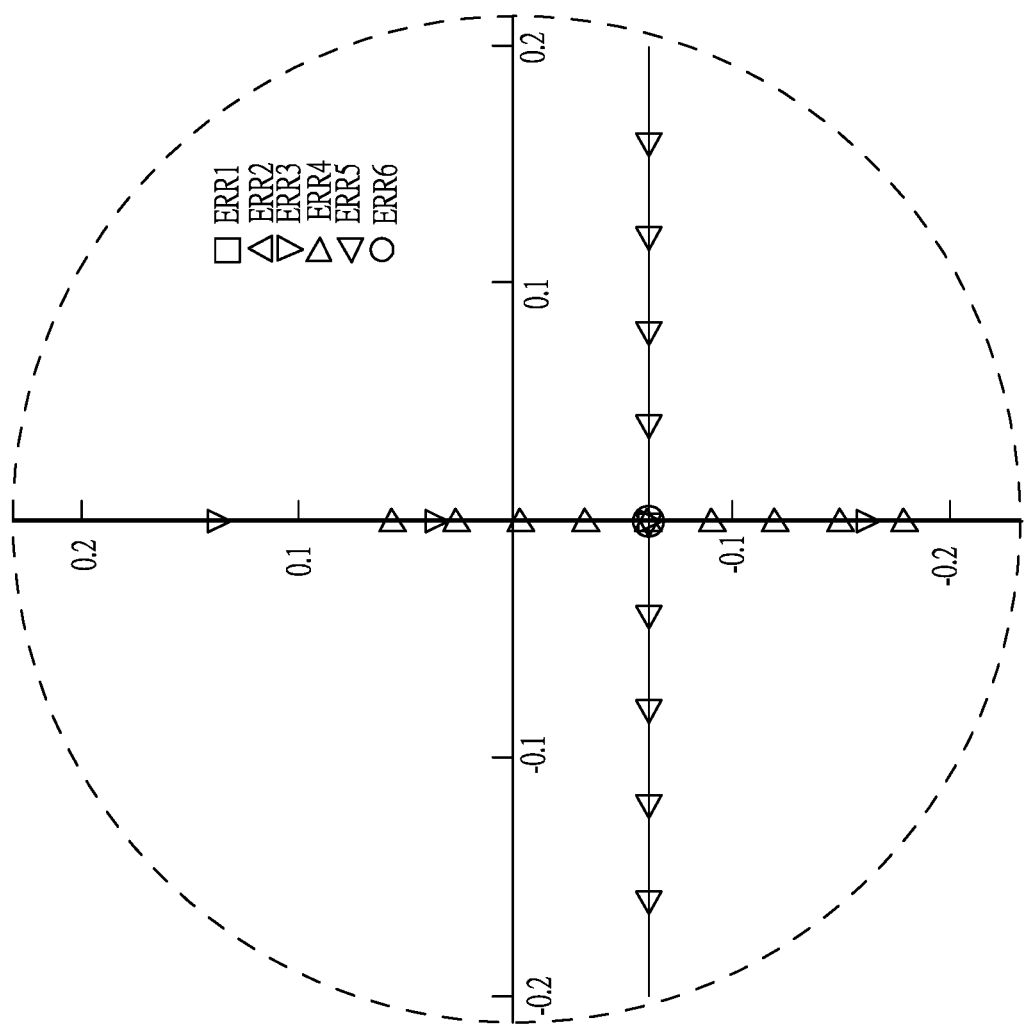
FIG. 11B shows an enlarged view of FIG. 11A.

As shown in FIG. 11A, the x-axis radial error ERR1 is distributed horizontally on the frame. Most errors, such as the axial error ERR3 and the tilt error for the y-axis ERR5, are distributed in the zone A. Furthermore, as shown in FIG. 11B, by enlarging the zone A, the axial error ERR3, the x-axis tilt error ERR4, the tilt error for the y-axis ERR5, and the angular alignment error for rotation ERR6 are concentrated at the coordinates (−0.0001, −0.06); the x-axis tilt error ERR4 and the tilt error for the y-axis ERR5 are distributed interlacedly at the coordinates (−0.0001, −0.06); and the axial error ERR3 and the x-axis tilt error ERR4 overlap.

Accordingly, the multi-degree-of-freedom error measurement system and the method thereof according to the present invention can measure the variation of light passing the multi-facet reflector 14 and the axicon 16. By analyzing the relation between the variation of light spots and errors, a more precise measurement result will be given for multi-degree-of-freedom errors. Then the present invention can be applied to measuring error in a plurality of degrees of freedom caused by rotation of the axis average line Ro.

What is claimed is:

1. A multi-degree-of-freedom error measurement system, comprising:
  a plurality of light sources, producing a first ray, a second ray, and a third ray along one of an x-axis and y-axis;
  a multi-facet reflector, disposed on an axis average line, said first ray incident to said multi-facet reflector, and said multi-facet reflector reflecting said first ray to produce a reflective ray;
  an axicon, disposed on said multi-facet reflector, said second ray and said third ray incident to said axicon, forming a plurality of incident rays corresponding to a plurality of refractive vectors and one or more reflective vectors inside said axicon, respectively, and forming a first emitted ray and a second emitted ray from said incident rays while the rotation by said axicon is driven by an axis average line;
  a plurality of two-dimensional optoelectrical sensors, disposed in the reflective direction of said multi-facet reflector reflecting said first ray and the light-emitting direction of said axicon outputting said first emitted ray and said second emitted ray, respectively, and the rotation of said axis average line driving said reflective ray, said first emitted ray, and said second emitted ray to form location variations on said plurality of two-dimensional optoelectrical sensors; and
  an operational unit, disposed in a host to connect electrically to said plurality of two-dimensional optoelectrical sensors, executing statistics and operating a light path according to the initial vectors to read sensing results of said two-dimensional optoelectrical sensors while said host connected to said plurality of two-dimensional optoelectrical sensors, said plurality of refractive vectors, and said one or more reflective vectors of said first ray, said second ray, and said third ray to obtain a x-axis radial error, a y-axis radial error, an axial error, a x-axis tilt error, y-axis tilt error, and an angular alignment error for rotation as the axis average line rotates according to the location variations of said first emitted ray and said second emitted ray on said plurality of two-dimensional optoelectrical sensors.

2. The multi-degree-of-freedom error measurement system of claim 1, wherein said operational unit calculates according to a ray tracing method and a first-order Taylor expansion equation to give said x-axis radial error, said y-axis radial error, said axial error, said x-axis tilt error, said tilt error for the y-axis, and said angular alignment error for rotation.

3. A multi-degree-of-freedom error measurement system, comprising:
  a light source, producing an x-axis ray;
  an axicon, disposed on an axis average line, said x-axis ray incident to said axicon along an x-axis and producing one or more refractions to produce an x-axis emitted ray while the rotation by said axicon is driven by said axis average line;
  a pair of x-axis two-dimensional optoelectrical sensors, located in the emitting direction of said x-axis emitted ray for sensing said x-axis emitted ray; and
  an operational unit, disposed in a host to connect electrically to said x-axis two-dimensional optoelectrical sensors to read sensing results of said two-dimensional optoelectrical sensors while said host connected to said plurality of two-dimensional optoelectrical sensors, operating an x-axis radial error and a x-axis tilt error according to the vector variations of said x-axis ray and said x-axis emitted ray on said pair of x-axis two-dimensional optoelectrical sensors.

4. The multi-degree-of-freedom error measurement system of claim 3, wherein said operational unit calculates according to a ray tracing method and a first-order Taylor expansion equation to give said x-axis radial error and said x-axis tilt error.

5. A multi-degree-of-freedom error measurement system, comprising:
  a light source, producing a y-axis ray;
  an axicon, disposed on an axis average line, said y-axis ray incident to said axicon along a y-axis and producing one or more refractions to produce a y-axis emitted ray while the rotation by said axicon is driven by said axis average line;
  a pair of y-axis two-dimensional optoelectrical sensors, located in the emitting direction of said y-axis emitted ray for sensing said y-axis emitted ray; and
  an operational unit, disposed in a host to connect electrically to said y-axis two-dimensional optoelectrical sensors to read sensing results of said two-dimensional optoelectrical sensors while said host connected to said plurality of two-dimensional optoelectrical sensors, operating a y-axis radial error and y-axis tilt error according to the vector variations of said y-axis ray and said y-axis emitted ray on said pair of y-axis two-dimensional optoelectrical sensors.

6. The multi-degree-of-freedom error measurement system of claim 5, wherein said operational unit calculates according to a ray tracing method and a first-order Taylor expansion equation to give said x-axis radial error and said x-axis tilt error.

7. A multi-degree-of-freedom error measurement system, comprising:
  a plurality of light sources, producing an x-axis ray and a y-axis ray having different initial vectors;
  an axicon, location on an axis average line and located at an intersection point of said x-axis ray and said y-axis ray, said x-axis ray and said y-axis ray incident to said axicon to produce a plurality of incident rays corresponding to a plurality of refractive vectors and one or more reflective vectors and to produce an x-axis emitted ray and a y-axis emitted ray for emitting while the rotation by said axicon is driven by said axis average line, and an angle formed between said x-axis emitted ray and said y-axis emitted ray;

a plurality of two-dimensional optoelectrical sensors, receiving said x-axis emitted ray and said y-axis emitted ray emerged from said axicon; and an operation unit, disposed in a host to connect electrically to said plurality of two-dimensional sensors to read sensing results of said two-dimensional optoelectrical sensors while said host connected to said plurality of two-dimensional optoelectrical sensors, operating the vector variations of said x-axis ray and said y-axis ray and the vector variations of said x-axis emitted ray and said y-axis emitted ray on said plurality of two-dimensional optoelectrical sensors to give a x-axis radial error, a x-axis tilt error, a y-axis radial error, and y-axis tilt error.

8. The multi-degree-of-freedom error measurement system of claim 7, wherein said operational unit calculates according to a ray tracing method and a first-order Taylor expansion equation to give said x-axis radial error, said x-axis tilt error, said y-axis radial error, and said tilt error for the y-axis.

9. A multi-degree-of-freedom error measurement method, comprising steps of:

producing a first ray, a second ray, and a third ray having different initial vectors;

driving said first ray, said second ray, and said third ray to output to a multi-facet reflector and an axicon on an axis average line, said multi-facet reflector producing a reflective ray according to said first ray, said second ray and said third ray forming a plurality of incident rays corresponding to a plurality of refractive vectors inside said axicon and one or more reflective vectors to form a first emitted ray and a second emitted ray while the rotation by said axicon is driven by said axis average line;

using a plurality of two-dimensional optoelectrical sensors to receive said reflective ray, said first emitted ray, and said second emitted ray, the rotation of said axis average line driving said reflective ray, said first emitted ray, and said second emitted ray to form vector variations on said plurality of two-dimensional optoelectrical sensors; and using an operational unit executing statistics and operation according to the initial vectors, said plurality of refractive vectors, and said one or more reflective vectors of said first ray, said second ray, and said third ray to obtain an x-axis radial error, a y-axis radial error, an axial error, a x-axis tilt error, y-axis tilt error, and an angular alignment error for rotation according to the vector variations of said first emitted ray and said second emitted ray.

10. The multi-degree-of-freedom error measurement method of claim 9, wherein said step of driving said first ray, said second ray, and said third ray to output to a multi-facet reflector and an axicon on an axis average line, said second ray and said third ray are transferred to said axicon along an x-axis and a y-axis.

11. The multi-degree-of-freedom error measurement method of claim 9, wherein said step of an operational unit executing statistics and operation according to the vector variations of said first emitted ray and said second emitted ray, said operational unit calculates to obtain said x-axis radial error, said y-axis radial error, said axial error, said x-axis tilt error, said tilt error for the y-axis, and said angular alignment error for rotation according to a plurality of reflective vectors of said reflective ray, said first emitted ray, and said second emitted ray converted form said first ray, said second ray, and said third ray and according to a boundary vector of said axicon.

* * * * *